United States Patent [19]

Nakadate et al.

[11] Patent Number: 4,559,438
[45] Date of Patent: Dec. 17, 1985

[54] WELDING GUN APPARATUS

[75] Inventors: Toshihiko Nakadate, Sayama; Morikuni Numata, Ageo; Akio Hamada, Tokorozawa; Gen Tsujii, Kawagoe, all of Japan

[73] Assignee: Honda Giken Kogyo Kabushiki Kaisha, Tokyo, Japan

[21] Appl. No.: 564,526

[22] Filed: Dec. 22, 1983

[30] Foreign Application Priority Data

Dec. 24, 1982 [JP] Japan .............................. 57-225922
Jan. 21, 1983 [JP] Japan ................................ 58-7409

[51] Int. Cl.⁴ ............................................ B23K 11/10
[52] U.S. Cl. ....................................... 219/90; 219/116
[58] Field of Search .............. 219/89, 90, 86.25, 116; 901/42

[56] References Cited

U.S. PATENT DOCUMENTS

| | | | |
|---|---|---|---|
| 2,349,835 | 5/1944 | Strickland, Jr. ..................... | 219/89 |
| 2,517,653 | 8/1950 | Gaston .................................. | 219/90 |
| 2,961,527 | 11/1960 | Tortorella ............................. | 219/90 |
| 3,523,172 | 8/1970 | Wilbur ................................... | 219/89 |
| 3,920,950 | 11/1975 | Caprioglio ........................ | 219/89 X |
| 4,496,821 | 1/1985 | Burgher et al. ..................... | 219/116 |

Primary Examiner—C. L. Albritton
Assistant Examiner—C. M. Sigda
Attorney, Agent, or Firm—Armstrong, Nikaido, Marmelstein & Kubovcik

[57] ABSTRACT

A welding gun apparatus having a gun bracket, a pair of arms pivotally mounted on the bracket, a transformer mounted on the bracket, and a pressure applying mechanism on the bracket for opening and closing the gun arms; characterized in that the gun bracket comprises a frame which extends longitudinally from a front pivot portion for pivotally supporting the gun arms to a rear portion, the transformer being positioned in and fixed to the frame between the front pivot portion and the rear portion.

3 Claims, 7 Drawing Figures

WELDING GUN APPARATUS

BACKGROUND OF THE INVENTION

This invention relates to a welding gun apparatus which is chiefly used as an attachment for an industrial robot.

Welding gun apparatuses are known as shown in FIG. 1, for instance, to include a pair of gun arms c, c provided on a gun bracket b in front of a transformer a. The gun arms c, c are operated to open and close by a pressure applying mechanism d provided between the two gun arms c, c. It has been usual with this arrangement that the gun bracket b is attached to a front surface of the transformer a. The entire apparatus is attached to an industrial robot e through the transformer a with the transformer a being used as a supporting member for the entire apparatus. This type of arrangement, however, is inconvenient in that, it becomes necessary to make a casing for the transformer a large in size and thickness in order to ensure having the necessary mechanical strength. Consequently, the entire apparatus including the transformer a contained in such a case is increased in weight. Accordingly, the robot e is less movable. Furthermore, because of the large-sized casing, a mold material such as resin or the like for filling in the casing is increased in amount, and the cost of manufacturing of the apparatus becomes high.

Additionally, there has also been known a robot, as shown in FIGS. 2 and 3, which has a robot main body $e_1$ movable upwards and downwards along guide bars $e_2$, $e_2$. The main body $e_1$ is provided with a pair of front and rear robot arms $e_3$, $3_3$. A welding gun apparatus is supported, at a front end of a gun bracket b thereof and at a rear end of a transformer a thereof, on the respective robot arms $e_3$, $e_3$. Thus, this type of arrangement has almost the same inconveniences as the foregoing type of arrangement in that, because the transformer a is used as a supporting member for supporting the entire apparatus in its cooperation with the bracket b, it is necessary for the transformer a to be increased in its mechanical strength.

OBJECTS AND SUMMARY OF THE INVENTION

This invention has for its object to provide a welding gun apparatus wherein a gun bracket is used as a supporting member for the entire apparatus, and a transformer is supported on the bracket so that the transformer with the casing and, accordingly the entire apparatus may be decreased in size and weight without the inconveniences described above.

Namely, according to this invention, in an apparatus of the type that a pair of gun arms are provided on a gun bracket in front of a transformer to be movable to open and close by a pressure applying mechanism provided between the two gun arms, the invention is characterized in that the gun bracket is formed into a frame extending longitudinally in the longitudinal direction to range from a front pivot portion for pivotally supporting the gun arms to a rear position which is beyond a position for the transformer, and the transformer is positioned in and fixed to the gun bracket.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
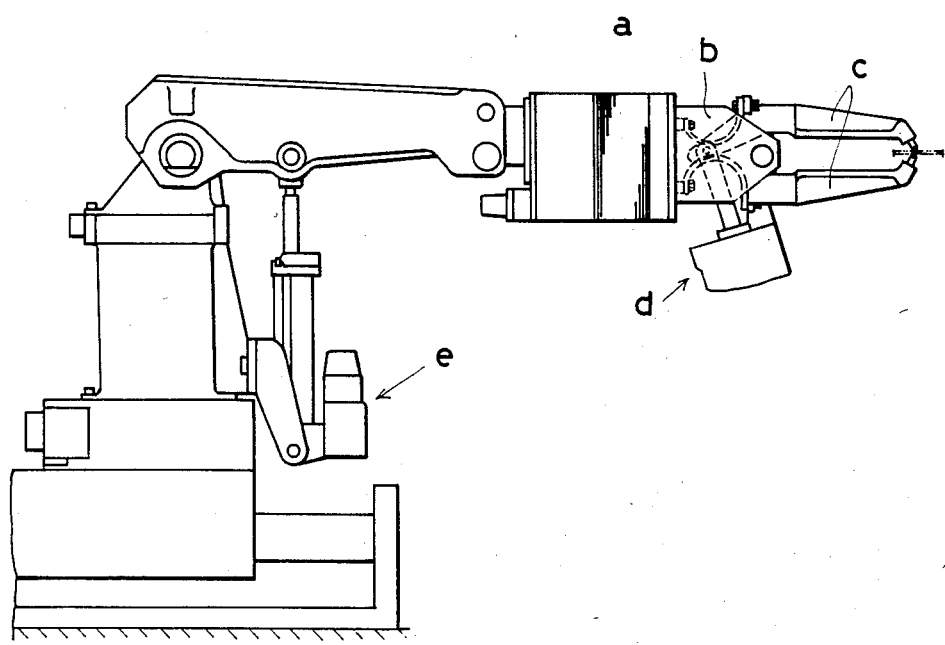
FIG. 1 is a side view of one example of a conventional apparatus.

One embodying example of this invention will now be explained with reference to the accompanying drawings:

Referring to FIGS. 4 to 7 a pair of upper and lower gun arms 1, 1 each has at its front end an electrode 1a. A gun bracket 2 pivotally supports these gun arms 1, 1. The gun bracket 2 is formed into a frame which extends in the longitudinal direction to range from its front end pivot portion 2a for pivotally supporting the gun arms 1, 1 to a rear position for a transformer 5 described below.

More in detail, in the illustrated example, the gun bracket 2 is in the form of a frame which is composed of the front end pivot portion 2a and a pair of right and left lateral side panels 2c, 2c extending rearwards from the front end pivot portion 2a. Additionally, a rear end panel 2b connects the lateral side panels 2c, 2c, and serves as an attaching base portion 2b for attaching a robot wrist portion (not shown). A supporting shaft of the front end pivot portion 2a extends horizontally and laterally to front end portions of the two lateral side panels 2c, 2c, so that the gun arms 1, 1 are pivotally supported on the supporting shaft 2a. The gun arms 1, 1 are arranged to be operated to open and close by operation of a pressure applying mechanism 3 provided between the two arms 1, 1.

Each of the gun arms 1, 1 is constructed having an arm main body 1b extending forwards fixed at its base portion by bolts to a lever rod 1c pivotally supported on the pivot portion 2a. The pressure applying mechanism 3 includes a cylinder 4 fixed to the lever rod 1c of one of the gun arms 1, 1 and a piston rod 4a connected to the lever rod 1c of the other of the gun arms 1, 1.

According to this invention, the transformer 5 is positioned in and fixed to the frame type gun bracket 2, for instance, in such a manner that a core 6 thereof is held between front and rear holding frames 7, 7.

More in detail, in the illustrated example, the transformer 5 is constructed with a core 6 comprising two upper and lower divided half portions fastened together by fastening bands 8. A primary coil 9 and a copper plate secondary coil 11 with a water cooling pipe 10 are wound on the core 6. The core 6 is firmly held between the foregoing two holding frames 7, 7 from front and rear sides thereof by fastening bolts 12. Cover plates 13, 13 are fixedly applied to respective outer surfaces of the two holding frames 7, 7, so that the two holding frames 7,7 and the cover plates 13, 13 constitute a casing. The interior defined by the casing and the core 6 of the transformer 5 is filled with a molding material 14 such as resin. The transformer 5 thus constructed is inserted between the two side lateral panels 2c, 2c of the gun bracket 2, and is fixed by bolts, at the holding frames 7,7 thereof, to a lower cover plate 2d and an upper cover plate 2e bridged between the two side lateral panels 2c, 2c.

Figure 7:
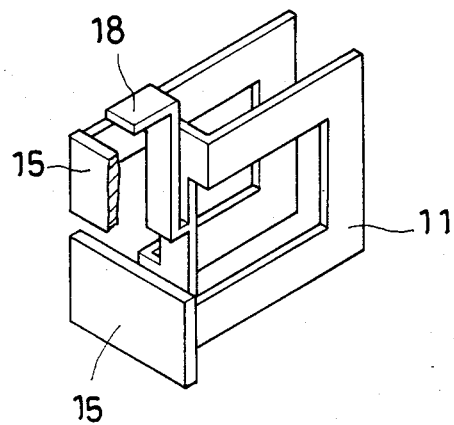
FIG. 7 is a perspective view of a secondary coil used in a transformer of the present invention.
Figure 4:
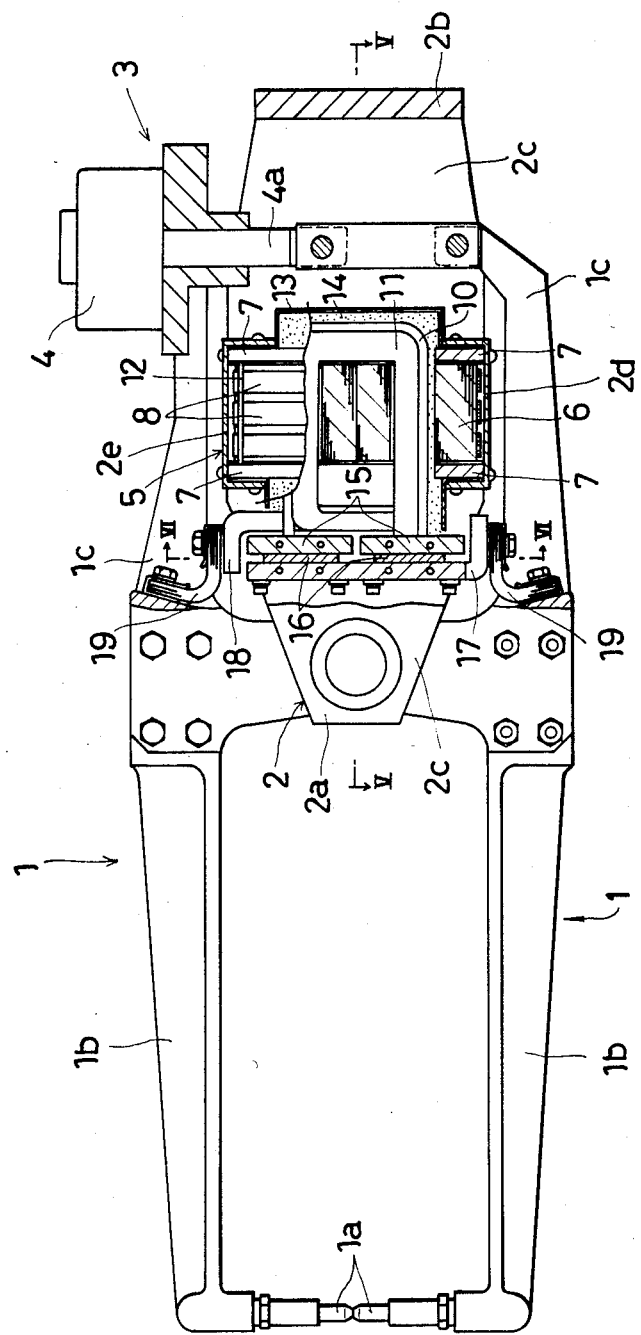
FIG. 4 is a side view, partly in section, of one example of this invention.

As clearly shown in FIG. 4 and FIG. 7, the number of coils of the secondary coil 11 is two turns. The transformer 5 is provided at its front surface with a pair of upper and lower terminal plates 15, 15 fixed to both end portions of the coil 11, a single common tap terminal plate 17 which is put on the two terminal plates 15, 15 through respective rectifier elements 16, 16 and a center tap terminal plate 18 extended from a middle portion of the coil 11. The two tap terminal plates 17, 18 are connected to the arm main bodies 1b, 1b of the gun arms 1, 1 through respective flexible copper plates 19, 19.

Owing to this arrangement, the weight of the entire welding gun apparatus is supported by the gun bracket 2, and the weight of the apparatus is not applied to the transformer 5. Thus, the holding frames 7, 7 can be made with only that strength needed for supporting the weight of the transformer 5. Consequently, the same can be made into flat-plate-shaped and light weight ones. Additionally the transformer 5 can be decreased in size and consequently the amount of the molding material 14 necessary for filling the interior spaces thereof can be decreased.

In order that the welding gun apparatus may be further decreased in size and weight, it is desirable that the foregoing pressure applying mechanism is decreased in capacity and size. For meeting this desire, in the illustrated example, the two gun arms 1, 1 are provided at their rear ends with rearwardly extended portions 1c, 1c, which extend beyond a position for the transformer 5, and the pressure applying mechanism 3 is provided on end portions of the rearwardly extended portions thereof.

Figure 2:
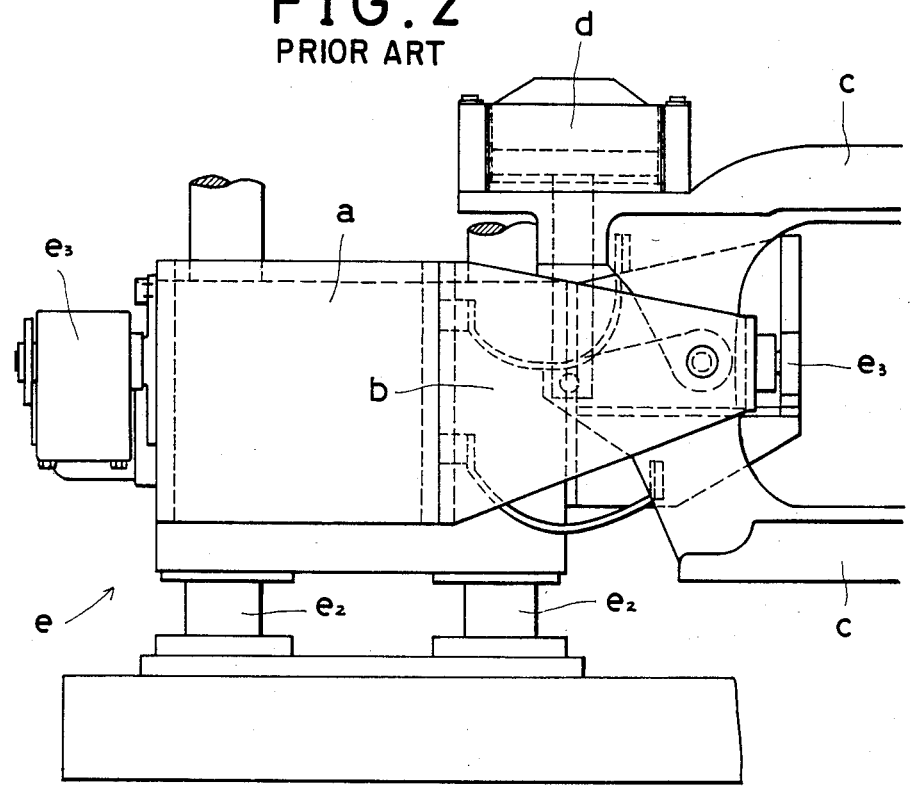
FIG. 2 is a side view of another example of a conventional apparatus.
Figure 3:
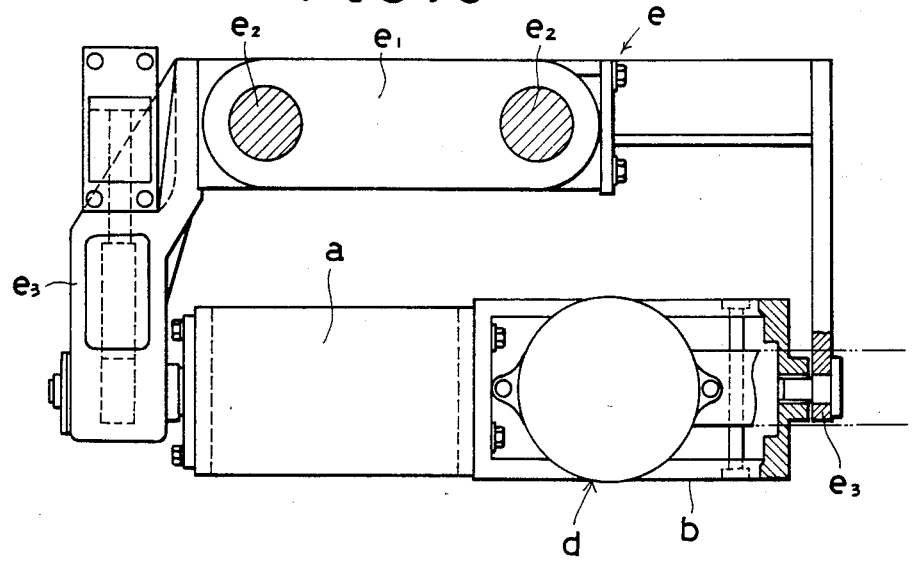
FIG. 3 is a top plan view of the apparatus of FIG. 2.

In connection with this, it has been usual with the conventional apparatus that, as shown in FIGS. 1 to 3, for instance, the pressure applying mechanism d is provided in rear of the pivot portion of the gun arms c, c, and the transformer a is provided in rear of the pressure applying mechanism d. As a result of this arrangement, a distance between the pressure applying mechanism d and the pivot portion of the gun arms c, c is comparatively short, so that the pressure applying mechanism d is required to be made a comparatively large capacity for applying a predetermined pressure to the gun arms c, c. Now, for removing this defect, according to this invention, when the pressure applying mechanism 3 is provided in rear of the transformer 5 as described above, the distance between the pivot portion 2a and the transformer is elongated and accordingly the pressure applying mechanism 3 can be decreased in capacity and size and weight. An additional advantage with this arrangement is that the transformer 5 can be provided near the front end pivot portion 2a, and thereby the length of each of the flexible copper plates 19 connecting between each gun arm 1 and the transformer 5 can be decreased in length. Loss of an electric current passing therethrough can be decreased and accordingly consumption of electric power can be decreased.

Figure 5:
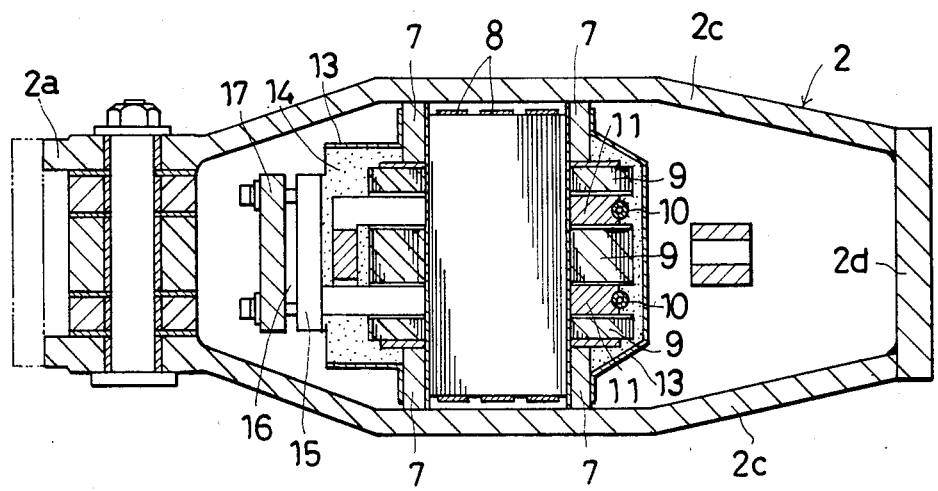
FIG. 5 is a sectional view taken along the line V—V in FIG. 4.
Figure 6:
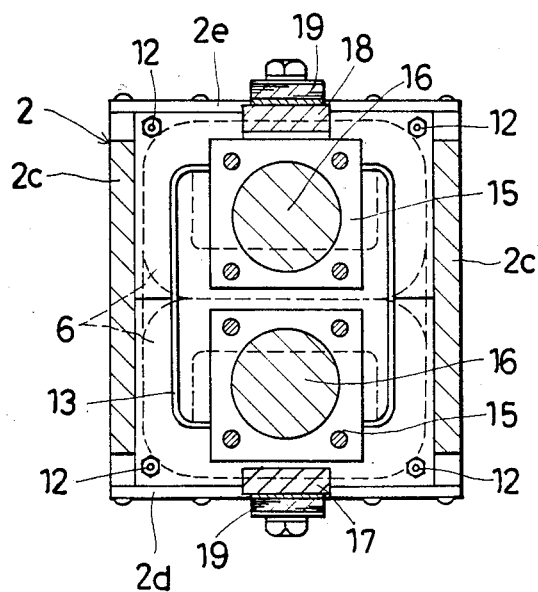
FIG. 6 is a sectional view taken along the line VI—VI in FIG. 4.

In a case where a robot having a pair of front and rear robot arms $e_3$, $e_3$ as shown in FIGS. 2 and 3 must be used, the gun bracket 2 is provided with a front end attaching base poriton 2f on a front end thereof, as shown in FIG. 5, in addition to the rear end attaching base portion 2b.

Thus, according to this invention, the gun bracket is formed into a frame extending in the longitudinal direction to range from a front end pivot portion for pivotally supporting a pair of gun arms to a rear position behind both lateral sides of a position at which a transformer is to be placed, and the transformer is positioned in and fixed to the gun bracket. The transformer need only have sufficient strength for supporting its own weight. Consequently, the transformer can be small-sized and the mold material for filling the interior space thereof can be decreased in amount. Accordingly the transformer can be lowered in cost and in weight. Additionally, owing to the fact that the transformer can be made small in size and weight, the entire welding gun apparatus can be decreased in weight and thereby the robot can be improved in movability.

It is readily apparent that the above-described welding gun apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A welding gun apparatus having a gun bracket, a pair of gun arms pivotally mounted on said bracket, each having a rear end, a transformer mounted on said bracket, and a pressure applying mechanism on said bracket for opening and closing said gun arms; characterized in that said gun bracket comprises a frame which extends longitudinally from a front pivot portion for pivotally supporting said gun arms to a rear portion, said frame having a pair of right and left lateral side panels interconnected at said front pivot portion, said rear portion having a rear end panel interconnected between said pair of lateral side panels, said transformer being positioned in said frame between said front pivot portion, said rear portion and said side panels and being fixed to said front pivot portion.

2. A welding gun apparatus having a gun bracket, a pair of gun arms pivotally mounted on said bracket, each having a rear end, a transformer mounted on said bracket, said arms having, at their rear ends, portions extending rearwardly of said transformer, and a pressure applying mechanism on said bracket for opening and closing said gun arms, the pressure applying mechanism being provided between end portions of the rearwardly extending portion; characterized in that said gun bracket comprises a frame which extends longitudinally from a front pivot portion for pivotally supporting said gun arms to a rear portion, said frame having a pair of right and left lateral side panels interconnected between said pair of lateral side panels, said transformer being positioned in and fixed to said frame between said front pivot portion, said rear portion and said side panels.

3. An apparatus according to claim 2, wherein the pressure applying mechanism is positioned between said transformer and said rear portion of said frame.

* * * * *